Figure 1:
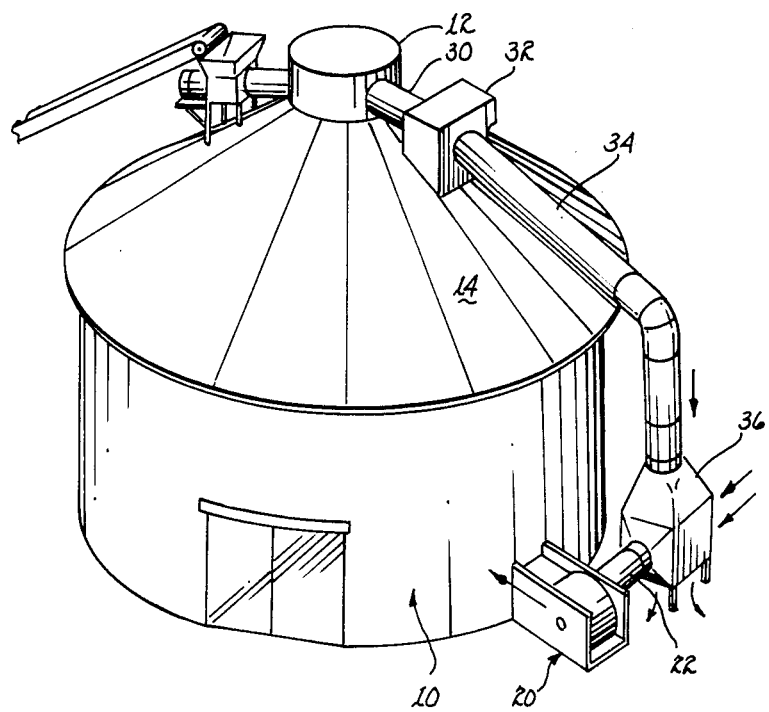

United States Patent [19]

Good

[11] Patent Number: 4,676,007

[45] Date of Patent: Jun. 30, 1987

[54] HEAT EXCHANGER FOR GRAIN ELEVATORS OR BINS

[76] Inventor: Harold M. Good, 5633 N. 17th St., Phoenix, Ariz. 85016

[21] Appl. No.: 701,775

[22] Filed: Feb. 14, 1985

[51] Int. Cl.[4] .............................................. F26B 9/02
[52] U.S. Cl. .......................................... 34/56; 34/35; 34/86; 34/233
[58] Field of Search ...................... 34/35, 86, 233, 77, 34/225, 56; 165/163

[56] References Cited

U.S. PATENT DOCUMENTS

| | | | |
|---|---|---|---|
| 1,655,086 | 1/1928 | Blanding | 165/163 |
| 3,404,467 | 10/1968 | Burghard | 34/56 |
| 3,859,735 | 1/1975 | Katterjohn, Jr. | 34/86 |
| 4,028,817 | 6/1977 | Winstel | 34/86 |
| 4,205,456 | 6/1980 | Ayers et al. | 34/86 |
| 4,256,029 | 3/1981 | Steffen et al. | 98/55 |

*Primary Examiner*—Larry I. Schwartz
*Attorney, Agent, or Firm*—Cahill, Sutton & Thomas

[57] ABSTRACT

Heated and humidified air is withdrawn by a blower from the apex of a grain elevator or bin and passed through a heat exchanger to preheat fresh air drawn into the grain elevator or bin. A heater raises the temperature of the preheated fresh air and a further blower forces it into the grain elevator or bin to flow in and about the stored grain to draw moisture therefrom. An auger located at the apex of the grain elevator or bin to transport grain into the grain elevator or bin permits filling of the grain elevator or bin during flow of the drying air.

4 Claims, 7 Drawing Figures

HEAT EXCHANGER FOR GRAIN ELEVATORS OR BINS

The present invention relates to heat exchangers and, more particularly, to heat exchangers for preheating heated air flowing into and drawn from grain bins.

It is well known and accepted that grain in storage may not contain more than a certain minimum moisture content or else discoloration and spoilage will likely occur. To bring grain to the requisite minimum moisture content, various procedures have been developed. In U.S. Pat. No. 4,253,825, there is described a conveyor belt system for transporting grain past a hot air generator to dry the grain prior to storage. U.S. Pat. No 4,086,708 is directed to a concurrent counter-current flow grain dryer in the form of a tower with side walls, a top and a bottom. This tower has a wet grain receiving bin at the top and wet grain is delivered from the receiving bin into a drying chamber in response to gravity. Thereafter, the grain is subjected to both hot and cool air to dry the grain at a controlled rate to prevent stress cracking. U.S. Pat. No. 2,876,557 describes a recirculation system for fluidisation of grain.

An air flow system incorporating a pair of heat exchangers for preheating the air is described in U.S. Pat. No. 4,091,547. Herein, a first heat exchanger is located at the outlet of a flow of heated air and a second heat exchanger located at the inlet. A refrigerant flowing between the first and second heat exchangers transports heat from the first to the second heat exchanger to preheat the air flowing into the inlet. U.S. Pat. No. 4,132,011 is directed to a device for transporting fresh air past hot exhaust tubes and thence to a predrier to recover a quantity of heat from the exhaust air. U.S. Pat. No. 4,380,126 is directed to apparatus for drawing air from an exhaust pipe to recover heat and into a hot air chamber.

Drying apparatus used to dry tobacco leaves is described in U.S. Pat. No. 4,114,288 wherein the air to be heated is drawn adjacent the heating chamber to become preheated; moreover, the use of an adjacent solar roof further warms the preheated air. U.S. Pat. No. 4,263,721 describes a counterflow heat exchanger for reclaiming heat from air directed past tobacco leaves.

In the devices described above pertaining to grain, the drying apparatus and heat recovery processes used therewith are intended for use prior to storage of the grain. Moreover, such apparatus is used in conjunction with grain under transport which permits certain facility in ducting the drying air flow, whether it be concurrent or countercurrent and whether different segregable air flows are employed. None of such apparatus are particularly suitable for nor readily adaptable to the drying of grain which has been deposited in a grain bin.

The present invention is directed to a heat recovery system for use in conjunction with heated air blown into a grain bin to remove moisture and preheat the inflowing air.

It is therefore a primary object of the present invention to provide apparatus for drying grain in a grain bin and for recovering heat from the exhausted air.

Another object of the present invention is to provide apparatus for permitting filling of a grain bin during operation of inflow and exhaustion of heated air flow through the grain bin.

Still another object of the present invention is to provide a heat recovery system for use with a grain bin which precludes reintroduction of drawn off moisture.

Still another object of the present invention is to provide a heat exchanger which reduces the back pressure to lessen the load imposed on a forced air drier for grain bins and which preheats the inflowing air.

A further object of the present invention is to provide a heat exchanger for use in conjunction with hot air drying apparatus for grain bin which does not reintroduce drawn-off moisture.

A yet further object of the present invention is to provide a process for drying grain in storage.

A still further object of the present invention is to provide a process for filling a grain bin during operation of a forced air grain drying apparatus.

These and other objects of the present invention will become apparent to those skilled in the art as the description thereof proceeds.

Figure 2:
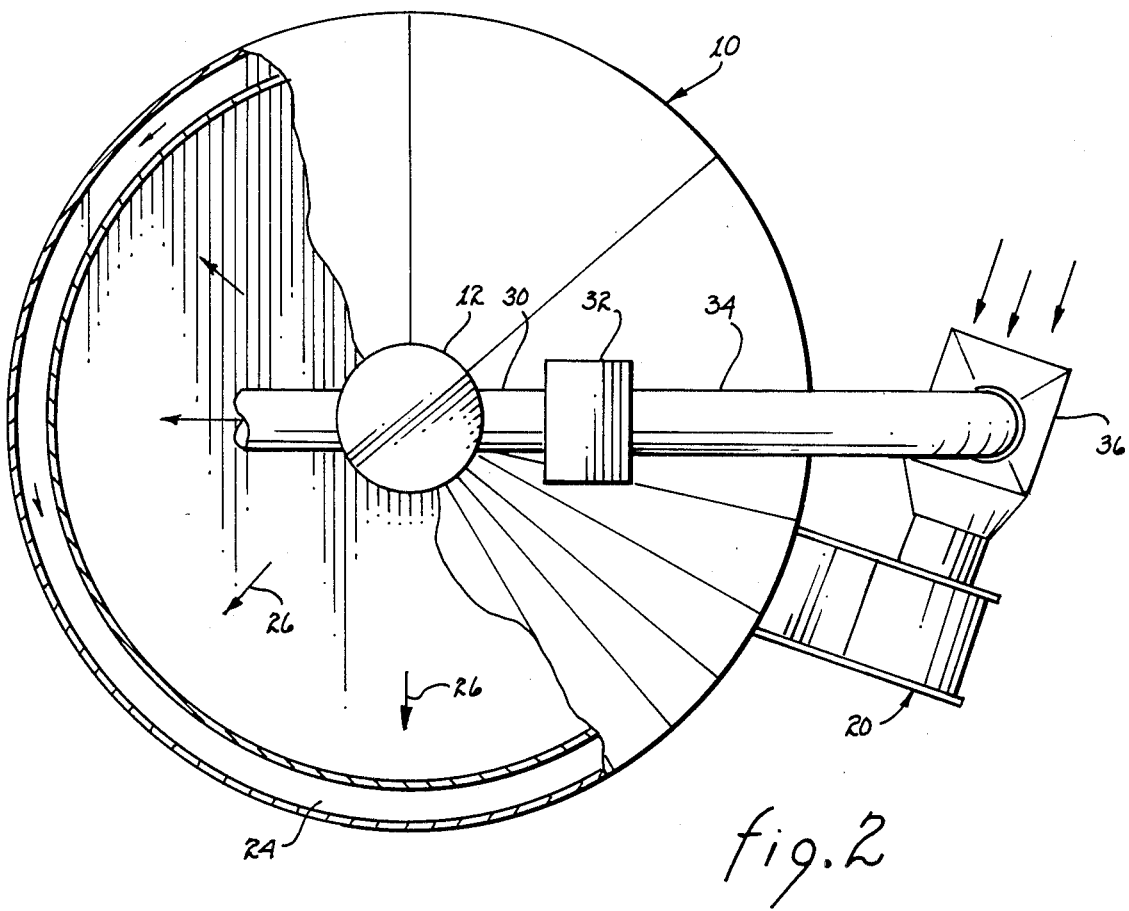
Figure 4:
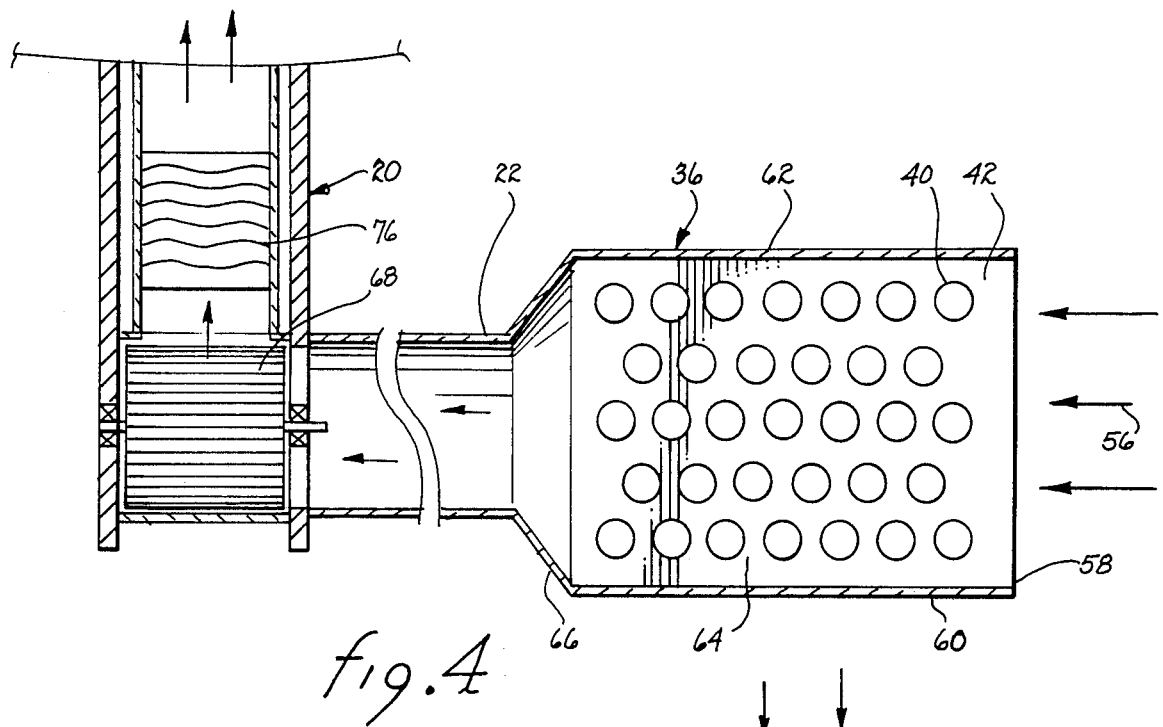
Figures 3, 5:
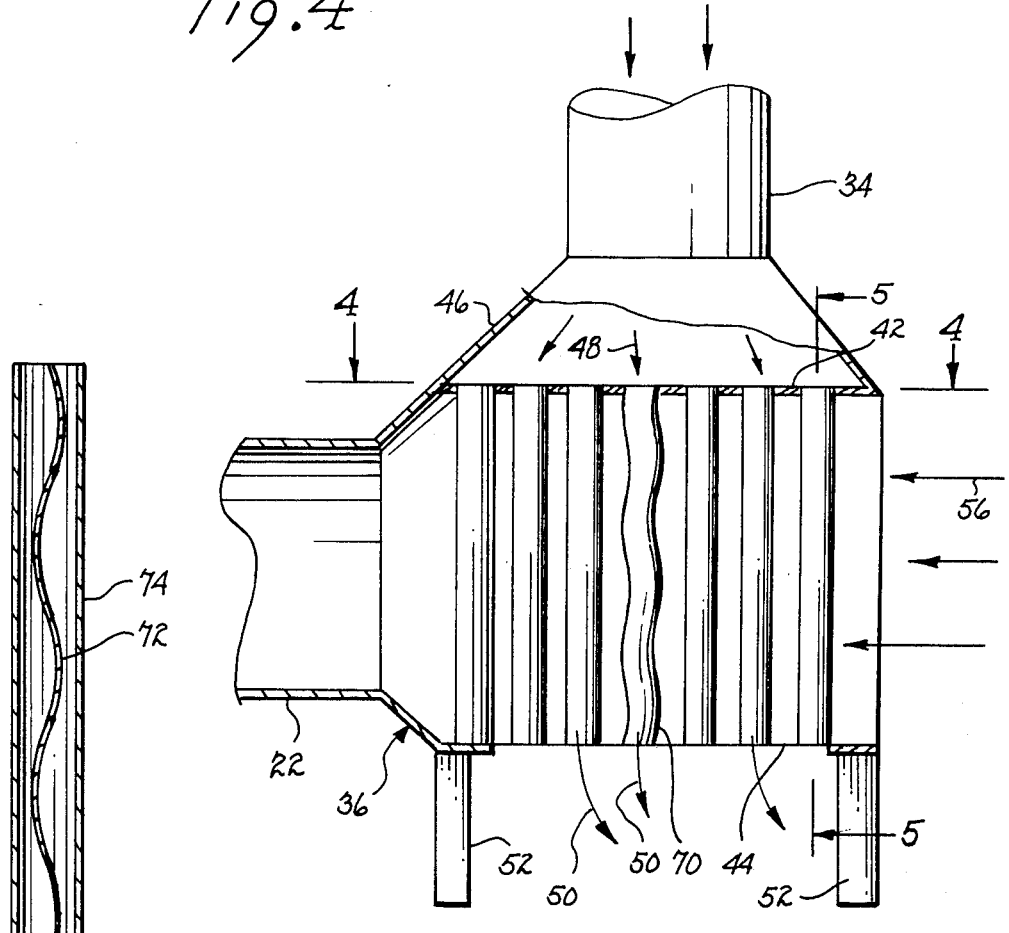
Figure 6:
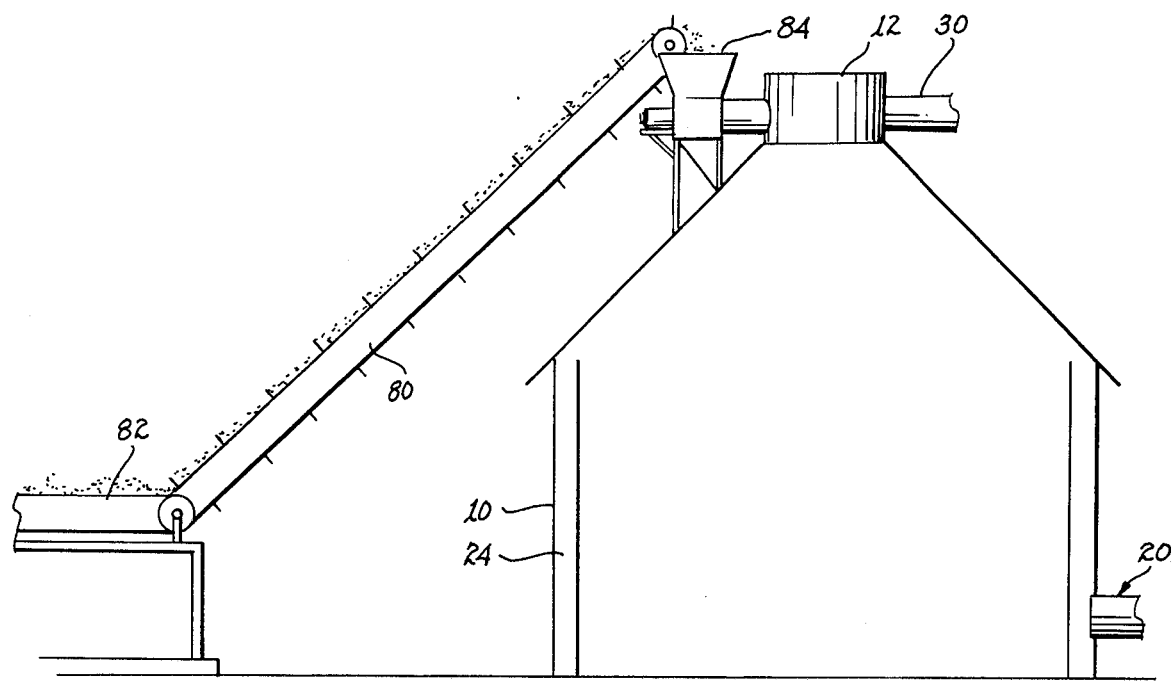
Figure 7:
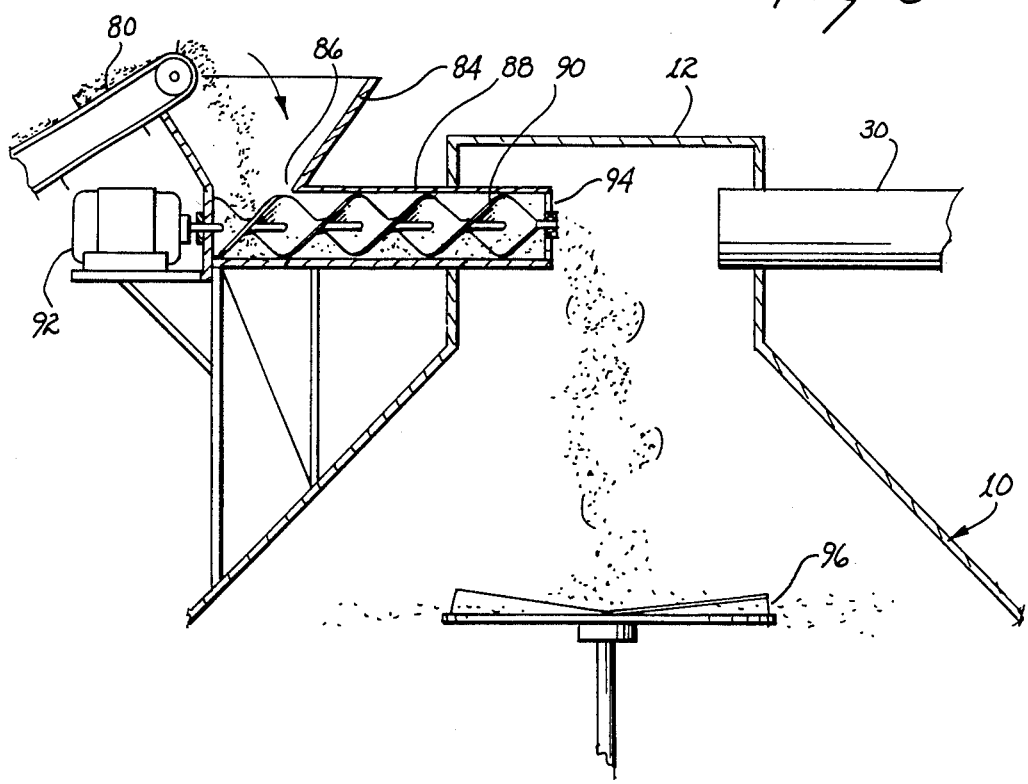

The present invention will be described with greater specificity and clarity with reference to the following drawings, in which:

FIG. 1 is a perspective view of the present invention;
FIG. 2 is a top view of the present invention and including a partial cut away view;
FIG. 3 is a partial cross-sectional view of the heat recovery unit;
FIG. 4 is a cross-sectional view taken along lines 4—4, as shown in FIG. 3;
FIG. 5 is a cross-sectional view taken along lines 5—5, as shown in FIG. 3;
FIG. 6 is a side view illustrating the grain feed mechanism; and
FIG. 7 is a detailed view illustrating the introduction of grain into the grain bin.

Referring to FIG. 1, there is shown a grain bin 10 having a turret 12 located at the apex of roof 14. The turret serves a combined purpose of receiving the grain to be stored and of collecting the exhaust air. A conventional blower and heating unit 20 draws air through conduit 22, heats it and blows the heated air into the grain bin. As shown in FIG. 2, the grain bin may include circumferential passageways or ducts 24 to distribute the heated air vertically through the grain stored in the bin. Additionally, radially oriented ducts, represented by arrows 26, may be incorporated at the bottom of the grain bin to distribute the heated air introduced by blower and heating unit 20.

As jointly illustrated in FIGS. 1, 2, 6 and 7, an outlet conduit 30 extends from turret 12 to collect and convey the exhaust air from within the grain bin. To aid the flow rate of the exhaust air and reduce the amount of back pressure within the grain bin, a blower 32 is employed in conjunction with duct 30 to draw the air from within the turret. It has been found that an air flow rate in the range of 5,000 to 25,000 cubic feet per minute imposed by blower 68 in combination with a similar flow rate imposed by blower 32 provides an air flow rate commensurate with economical drying of the grain within the grain bin. Down stream of blower 32, the exhaust air is conveyed through conduit 34 to heat recovery unit 36. The heat recovery unit is operatively associated with duct 22 to heat the fresh air flowing into the duct but preclude mixing therewith. The moisture ladden exhaust air passing through the heat recovery unit is discharged to the atmosphere to preclude reentry of the moisture into the grain bin.

Referring particularly to FIGS. 3, 4 and 5, heat recovery unit 36 will be described in detail. A plurality of pipes 40 are penetrably secured to and extend intermediate of upper plate 42 and lower plate 44. Upper plate 42 and the associated open ends of pipes 40 are circumscribed by a shroud 46 interconnecting the plate with the terminal end of conduit 34. The function of the shroud is that of directing the air exhausting from conduit 34, as represented by arrows 48, into and through pipes 40. The terminal ends of pipes 40, extending through plate 44, exhausts the heated moisture ladden air into the atmosphere, as represented by arrows 50. To avoid back pressure or other restrictive force upon the air exhausting from pipes 40, heat recovery unit 36 may be mounted upon a pedestal or legs 52 to provide a substantial open space beneath plate 44; it is contemplated that the exhausted air can be directed laterally instead of downwardly.

Fresh air, depicted by arrows 56, enters heat recovery unit 36 through opening 58 defined by the edges of plates 42, 44 and side walls 60, 62. The fresh air flowing through chamber 64, defined by plates 42, 44 and side walls 60, 62 flows in a circuitous and turbulent path around and about all of pipes 40. From chamber 64, the air flow enters a further shroud 66 and is drawn into duct 22 in response to the operation of blower 68 of blower and heater unit 20.

The air exhausted from conduit 34 has a certain heat content as a result of the heating performed upon this air upon introduction to the grain bin. It is obviously preferable to recover a portion of the heat if such recovery can be performed at a cost less than the cost of generating the heat equivalent to the heat recovered. Due to the simplicity of construction and lack of significant air flow impediments presented by heat recovery unit 36, such heat recovery has been found to be sufficiently efficient to warrant installation by providing a reduction in overall costs.

The heated moist air, flowing through pipes 40, will transfer a quantum of heat to these pipes. The quantum of heat transferred is a function of both the flow rate and the temperature differential between the heated exhaust air and the pipes. To slow the air flow rate through pipe 40 will increase the heat transfer rate but create backpressure for both blower 68 and blower 32. The additional work load imposed upon these two blowers must be considered with respect to the amount of back pressure tolerable in order to obtain a better heat transfer. The flow rate through pipes 40 can be slowed to some extent by configuring the pipes to be undulating or serpentine, as depicted by pipe 70. Alternatively, an undulating or serpentine membrane 72, extending partially or diametrically across pipe 74, which may replace one or more of pipes 40, as illustrated in FIG. 5, may be employed. Such membrane, tending to induce a lateral flow of air through the pipe, will somewhat impede the flow rate and yet establish little back pressure. The selection and use of either of the configurations represented by pipes 70 and 74 is a function of economics, flow rates and temperature differentials which must be considered for any given installation.

One of the detriments of many heat recovery systems is that of producing a mixing of the exhaust air with the inflowing air. With respect to the drying of grain, such mixing is counter-productive as moisture would be reintroduced into the grain bin. With the configuration of heat recovery unit 36, such transfer of moisture is precluded. The turbulent circuitous flow of fresh air through the heat recovery unit assures substantial heat transfer from pipes 40 to the inflowing air. Accordingly, the air drawn in by blower 68 is preheated to an extent which is a function of the relevant temperature differentials and flow rates. Heater 76 of blower and heating unit 20, illustrated in FIG. 4, is generally of the thermostat controlled type. The amount of heating performed by such heater is a function of the temperature of the impinging air; the greater the temperature of the impinging air the less heating need be done and the lower are the costs associated with the drying of the grain in the grain bin.

Conventionally, grain bins are filled by a conveyor transporting grain from a source to an opening in turret 12. Were turret 12 open to permit essentially unrestricted airflow through the opening, operation of heater and blower unit 20 would impede filling of the grain bin. Moreover, effective operation of heat recovery unit 36 would be essentially precluded as the heat recovery unit is of limited use unless it is used in conjunction with an essentially closed system. To avoid these problems and permit ongoing drying of the grain within the grain bin during fill, the grain transport apparatus depicted in FIGS. 1, 6 and 7 was developed.

A conventional conveyor 80 transports grain from a source of grain or another conveyor 82 to a hopper 84. The hopper directs grain deposited therein through an inlet 86 of housing 88 for an auger 90. The auger is actuated through energization of a motor 92. The auger transports the grain from inlet 86 through discharge port 94. The discharge port is located internal of turret 12 and in general vertical alignment with a conventional rotating grain dispersing device 96 located within the grain bin.

While a certain amount of air flow through housing 88 from discharge port 94 to inlet 86 may occur in response to the air pressure within turret 12, the volume thereof is relatively insignificant with respect to the volume of air flow through the grain bin in response to operation of heater and blower unit 20. The grain bin, even with the grain introducing auger, remains essentially a closed system and operation of the heater and blower unit in combination with the heat recovery unit may be operated during fill of the grain bin.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:
1. Apparatus for preheating fresh air heated by a heater and blower unit and blown into a grain bin having a turret, which heater and blower unit is located proximate the bottom of the grain bin to inject a flow of heated air upwardly through and draw off moisture from the grain stored within the grain bin, said apparatus comprising in combination:
 (a) a chamber located adjacent the heating and blower unit for receiving an inflow of fresh air through an inlet and having an outlet in fluid communication with the heating and blower unit, said chamber including sidewalls and upper and lower plates interconnecting with said sidewalls;

(b) a plurality of pipes extending form said upper plate to said lower plate for conveying a segregated flow of air through said chamber, said plurality of pipes being temperature responsive to the air flowing therethrough;

(c) a blower in fluid communication with the upper end of the grain bin for drawing through the grain bin by the heating and blower unit and exhausting the heated air from the grain bin:

(d) a conduit for directing downwardly the flow of exhausted heated air from said blower into said plurality of pipes of said chamber; and (e) means for filling the grain bin with grain during operation of the heating and blower unit, said filling means comprising in combination:

(i) an housing extending into the turret from within the grain bin said housing including means for retaining an air flow intermediate the junction between said housing and the grain bin;

(ii) an auger rotatably mounted within said housing for conveying grain into the grain bin and for restraining air flow through said housing into and out of the grain bin;

(iii) a hopper for directing grain into said housing; and (iv) means for loading said hopper with grain;

whereby, the temperatures of said plurality of pipes will be raised by the exhausted heated air flowing therethrough and said plurality of pipes will transfer heat to and preheat the fresh air flowing therepast into the heating and blower unit.

2. The apparatus as set forth in claim 1 including a duct for interconnecting said blower with the turret.

3. A heat recovery unit for use with a grain bin having a turret and including a heating and blower unit for introducing heated air into the bottom of the grain bin for upward percolation of the heated air through the grain within the grain bin to draw off moisture from the grain, said heat recovery unit comprising in combination:

(a) a blower in fluid communication with the upper end of the grain bin for drawing the heated air introduced by the heating and blower unit through the grain and for exhausting the heated air from the grain bin;

(b) a chamber for conveying fresh air to the heating and blower unit, said chamber including an inlet for receiving the fresh air and an outlet for discharging the fresh air;

(c) means in fluid communication with said blower for directing the exhausted heated air to said chamber;

(d) means disposed within said chamber for receiving the heated exhausted air from said directing means and for transferring heat from the exhausted heated air to the fresh air flowing through said chamber from the inlet to the outlet while maintaining the exhausted heated air segregated from the fresh air:

(e) means for ducting the heated fresh air from the outlet of said chamber into the heating and blower unit; and (f) means for filling the grain bin with grain during operation of the heating and blower unit, and filling means comprising in combination:

(i) an housing extending into the turret from within the grain bin, said housing including means for retaining an air flow intermediate the junction between said housing and the grain bin;

(ii) an auger rotatably mounted within said housing for conveying grain into the grain bin and for restraining air flow through said housing into and out of the grain bin;

(iii) a hopper for directing grain into said housing; and (iv) means for loading said hopper with grain;

whereby, the fresh air drawn through said chamber is heated by the exhausted heated air without mixing therewith and a portion of the energy expended by the heating and blower unit is recovered to preheat the fresh air.

4. The heat recovery unit as set forth in claim 3 including a duct for interconnecting said blower with the turret.

* * * * *